United States Patent Office.

CARLETON B. HUTCHINS, OF ANN ARBOR, MICHIGAN.

Letters Patent No. 86,546, dated February 2, 1869.

IMPROVED COMPOSITION FOR MORTAR, CEMENT, PAINT, &c.

The Schedule referred to in these Letters Patent and making part of the same.

*To all whom it may concern:*

Be it known that I, CARLETON B. HUTCHINS, of Ann Arbor, in the county of Washtenaw, in the State of Michigan, have invented a new and improved Composition for Concrete Mortar and Paint, to be used for laying brick and stone, and painting the walls of buildings, and both to be used for various other purposes for which they may become adapted; and I do hereby declare that the following is a full and exact description thereof.

The nature of my invention consists in the compounding of ingredients for concrete mortar and paint, for laying brick and stone, and painting walls of buildings, and both to be used for various other purposes for which they may become adapted.

To enable others skilled in the art to compound and use my invention, I will proceed to describe the compounding and the use of the same.

I take one pound of pure rosin, four pounds of ground slate or ground stone, of any kind, and from four to six ounces of linseed or cotton-seed oil. Gravel or sand can be used in part, instead of ground stone. The oil can be diminished or increased, which enables the composition to be used as concrete mortar or paint. I pound the rosin up fine. If I use gravel or sand, I am careful to have it free from dirt, and dry. I then put all into a kettle, and heat it slowly, until the rosin is melted thoroughly, and then I stir it until all is well mixed. I am careful not to heat the ingredients hot enough to injure the oil.

Apply, when warm, with a trowel, for the mortar, and with a brush, when made thin enough to be used as paint.

What I claim as my invention, and desire to secure by Letters Patent, is—

The compounding of ingredients, as herein described, to make a composition for mortar and paint, and for various other purposes, as before described.

C. B. HUTCHINS.

Witnesses:
CALEB CLARK,
C. B. YOUNG.